E. L. BRACY.
POUCH LABELER.
APPLICATION FILED SEPT. 7, 1916.

1,234,722.

Patented July 31, 1917.
8 SHEETS—SHEET 1.

WITNESSES:

INVENTOR
Edward L. Bracy
By
James L. Norris
ATTORNEY

E. L. BRACY.
POUCH LABELER.
APPLICATION FILED SEPT. 7, 1916.

1,234,722.

Patented July 31, 1917.
8 SHEETS—SHEET 2.

Fig. 2.

WITNESSES:

INVENTOR
Edward L. Bracy
By
ATTORNEY

E. L. BRACY.
POUCH LABELER.
APPLICATION FILED SEPT. 7, 1916.

1,234,722.

Patented July 31, 1917.
8 SHEETS—SHEET 7.

WITNESSES:

INVENTOR
Edward L. Bracy
By James L. Norris,
ATTORNEY

E. L. BRACY.
POUCH LABELER.
APPLICATION FILED SEPT. 7, 1916.

1,234,722.

Patented July 31, 1917.
8 SHEETS—SHEET 8.

WITNESSES:

INVENTOR
Edward L. Bracy,
By James L. Norris,
ATTORNEY

UNITED STATES PATENT OFFICE.

EDWARD L. BRACY, OF BALTIMORE, MARYLAND, ASSIGNOR TO RICHARD H. WRIGHT, OF DURHAM, NORTH CAROLINA.

POUCH-LABELER.

1,234,722.   Specification of Letters Patent.   Patented July 31, 1917.

Application filed September 7, 1916. Serial No. 118,865.

*To all whom it may concern:*

Be it known that I, EDWARD L. BRACY, a citizen of the United States, residing at Baltimore, in the State of Maryland, have invented new and useful Improvements in Pouch-Labelers, of which the following is a specification.

The present invention relates to improvements in machines for packaging materials, such, for example, as tobacco, and more especially, to machines for applying labels or outer wrappers to packages or pouches containing the tobacco or other material.

The primary object of the invention is to provide an improved machine of this class whereby the labels or outer wrappers are applied rapidly and uniformly and fit tightly around the packages or pouches, although the packages may lack uniformity in the respects that some of the packages may be relatively soft, others hard, and there may be irregularities in the shape of the packages.

A machine for operating upon labels or wrappers of the same general class is shown and described in my prior Patent No. 843323, granted February 5, 1907, the present invention being an improvement thereon.

The invention consists in certain improvements and combinations and arrangements of parts, all of which will be hereinafter more fully described, the features of novelty being pointed out particularly in the claims at the end of the specification.

In the accompanying drawing:—

Similar parts are designated by the same reference characters in the several views.

Packaging machines constructed in accordance with the present invention are capable of use generally where it is desirable to apply a label, wrapper or the like to a pouch or package containing the material to be packed. My prior patent above referred to discloses a machine of this general class and it illustrates one use to which such a machine may be applied. In the present instance, one embodiment of the invention is shown and this embodiment of the invention is adapted particularly for the application of a label or wrapper to a pouch or package, which latter contains tobacco in a more or less granular form. It is to be understood that the invention is not restricted to the particular embodiment thereof shown, nor is it limited to the particular use referred to as modifications, and changes may be made in the construction of the machine without departing from the mode of operation or the result and the invention may be applied to other uses by employing constructions equivalent to that shown. Equivalent constructions are, therefore, contemplated and will be included within the scope of the claims.

The machine, as shown in the present instance, embodies a base or table 1 which serves as a support for the various parts of the machine. Preferably, and as shown, a standard 2 which supports the label feeding and gumming devices is mounted on the base or table, a standard 3 which supports the package feeding devices, and also the mold wheel, is mounted on the base or table, and a standard 4 which supports the mechanism for receiving the labeled packages is also mounted on the base or table. The main driving shaft 5 may be conveniently mounted in bearings 6 in the standard 2 arranged toward one end of the base and in a bearing 7 arranged toward the opposite end of the base, this driving shaft having a pulley or equivalent device 8 to receive power from any suitable source for the operation of the machine and a clutch 9 connects the driving pulley to the driving shaft whereby the machine may be started and stopped at will. As shown, a pair of controlling levers 10 and 11 are provided, these levers being located within convenient reach of the operator toward opposite ends of the machine, and these levers are connected to operate in unison by a rod 12, a link 13 connecting the levers to the clutch operating lever 14. Hand wheels 15 are preferably fixed on the driving shaft to enable the operator to manipulate the machine manually, if desired, or necessary.

Figures 8, 9, 10, 11, 12:
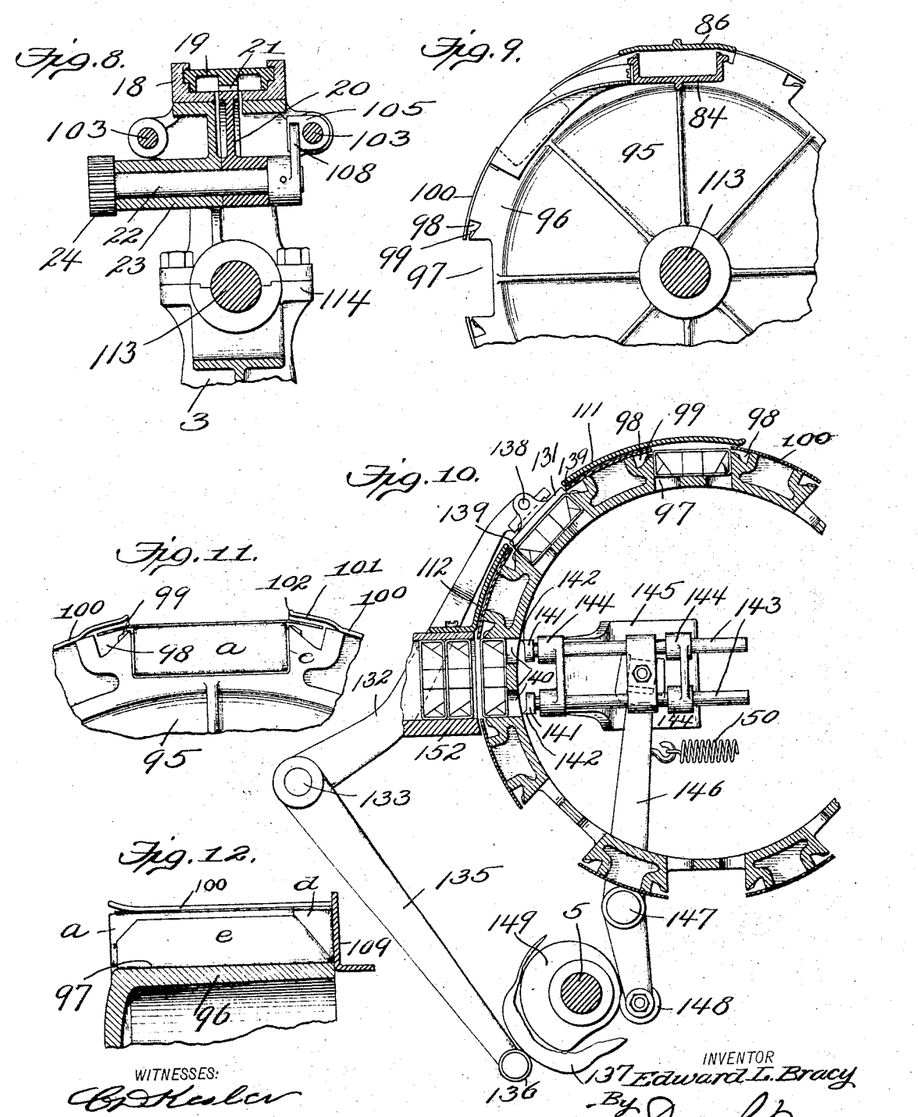
Fig. 8 represents a detail section taken on the line 8—8 of Fig. 7 and looking in the direction of the arrows.
Fig. 9 represents a section on the line 9—9 of Fig. 6 and looking in the direction of the arrows.
Fig. 10 shows a portion of the mold wheel and its coöperating devices in section.
Fig. 11 is a detail view showing one of the pockets of the mold wheel containing a package and a label partially folded about the package.
Fig. 12 represents a section taken longitudinally through one of the pockets of the mold wheel and showing a package and label therein as the same appear in Fig. 11.

The packages, which, in the present instance, are in the form of pouches a containing, for example, granular tobacco, are introduced in the form of a stack into an upright magazine 16 which may, as shown, be composed of two upright members of substantial channel form in cross section supported on the top of the standard by the socket 17. A channel 18 is formed in the top of the standard 3 and extends transversely across the bottom of the package magazine. A plunger 19 is mounted to reciprocate longitudinally in the channel and transversely across the bottom of the magazine, each advancing movement of the plunger causing the lowermost package in the magazine to be discharged therefrom in an endwise direction. Different means may be provided for effecting the necessary reciprocating movements of the plunger. As shown, a gear segment 20 is employed, this gear segment coöperating with a rack 21 formed in the under side of the plunger and the gear segment, as shown in Fig. 8, is fixed to a shaft 22, which latter is journaled in a bearing 23 attached to or forming a part of the standard 2. A pinion 24 is fixed to the shaft 22 and coöperates with a vertically movable rack 25, the latter being held in coöperative relation with the pinion 24 by a guide 26, and the rack is connected by a rod 27 to a roller 28, which latter coöperates with a cam 29 of suitable form on the driving shaft 5.

A label or wrapper receiving chute is mounted at that side of the package magazine toward which the packages are ejected therefrom. As shown, the chute 30 has a widened and laterally curved mouth to receive the labels and to divert them from a horizontal to a vertical position, the walls 31 of the chute extending vertically and in parallelism and being spaced sufficiently to insure free descent of the label between them, although supporting the label in substantially flat form. A gage is provided for determining the level to which the labels descend in the chute. Preferably, an adjustable gage is employed, that shown comprising a finger 32 which projects across the bottom of the chute and is pivoted at 33 upon an appropriate stationary bracket 34, the finger having an arm 35 fixed thereto and coöperating with a screw 36 whereby the level of the finger, and, in consequence, the level of the label in the chute, may be adjusted. The vertical walls 31 of the chute are formed with apertures 37 which register with one another and are in alinement with the channel 18 through which the packages are ejected from the bottom of the package magazine, and ordinarily, as in the present instance, the labels will be positioned at such a level in the chute that the bottom of the package or pouch, as the same is ejected from the package magazine, will engage the label centrally or midway of its height or length.

Different means may be provided for feeding the labels to the chute at appropriate intervals and for applying gum or paste to the labels preparatory to their entrance into the chute. In the present instance, a runway 38 is provided, this runway having, preferably, a flat bottom formed with a slot 39 extending longitudinal thereof and flanges 40 are provided at the longitudinal sides of the runway to guide the label as the latter is advanced along the runway, the flanges being spaced apart a distance slightly greater than the width of the label $b$. The labels are advanced along the runway and toward the chute by a chain 41 which has followers or hooks 42 attached thereto at appropriate intervals. These followers or hooks project upwardly through the slot 39 in the bottom of the runway and engage behind the labels lying flatwise on the bottom of the runway, the movement of the chain operating to advance the labels. The chain 41 may be of endless form and pass over a pair of sprockets. One of these sprockets 43 is shown, while the other is omitted. This sprocket 43 is fixed to a shaft 44, which latter has a driving sprocket 45 fixed thereto. A chain 46 passes over the sprocket 45 and over another sprocket 47 mounted on a shaft 48. A sprocket 49 on the shaft 48 receives motion from a chain 50, which latter is driven from a sprocket 52 fixed to a shaft 53, the latter receiving motion from the driving shaft 5, through the bevel gears 54.

Figure 1:
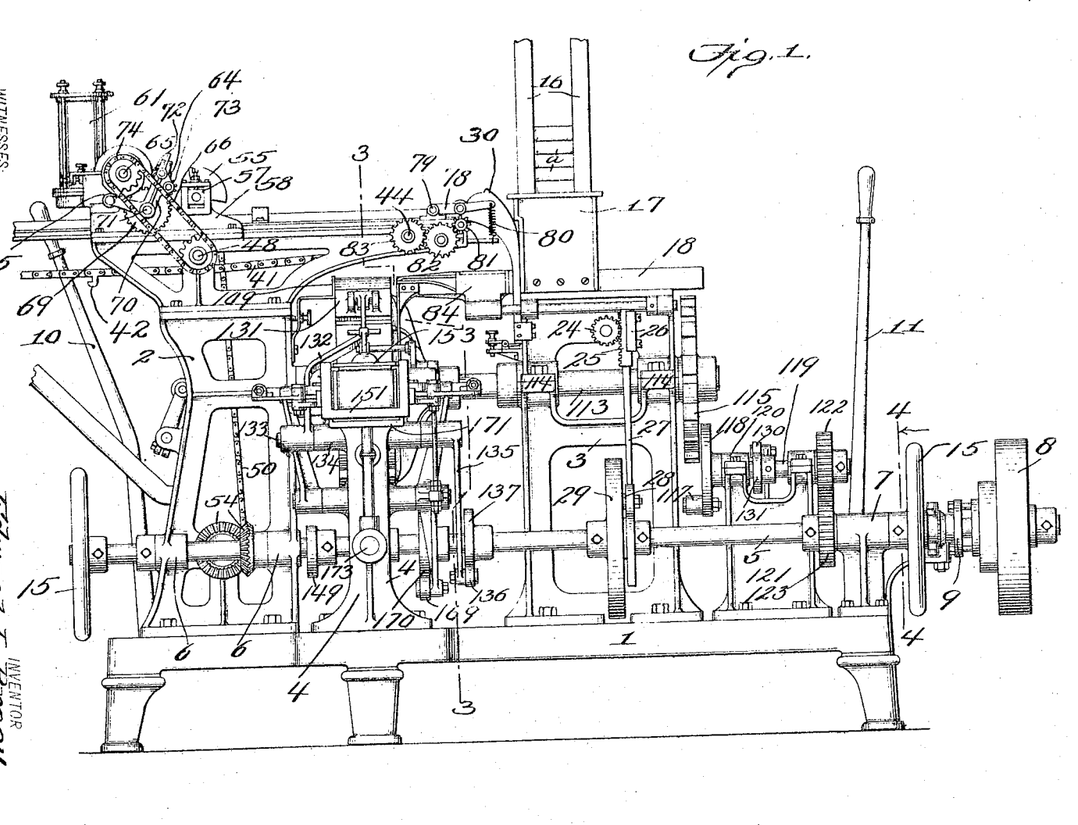
Figure 1 is an elevation of that side of the machine toward which the labeled or wrapped packages are discharged.
Figure 2:
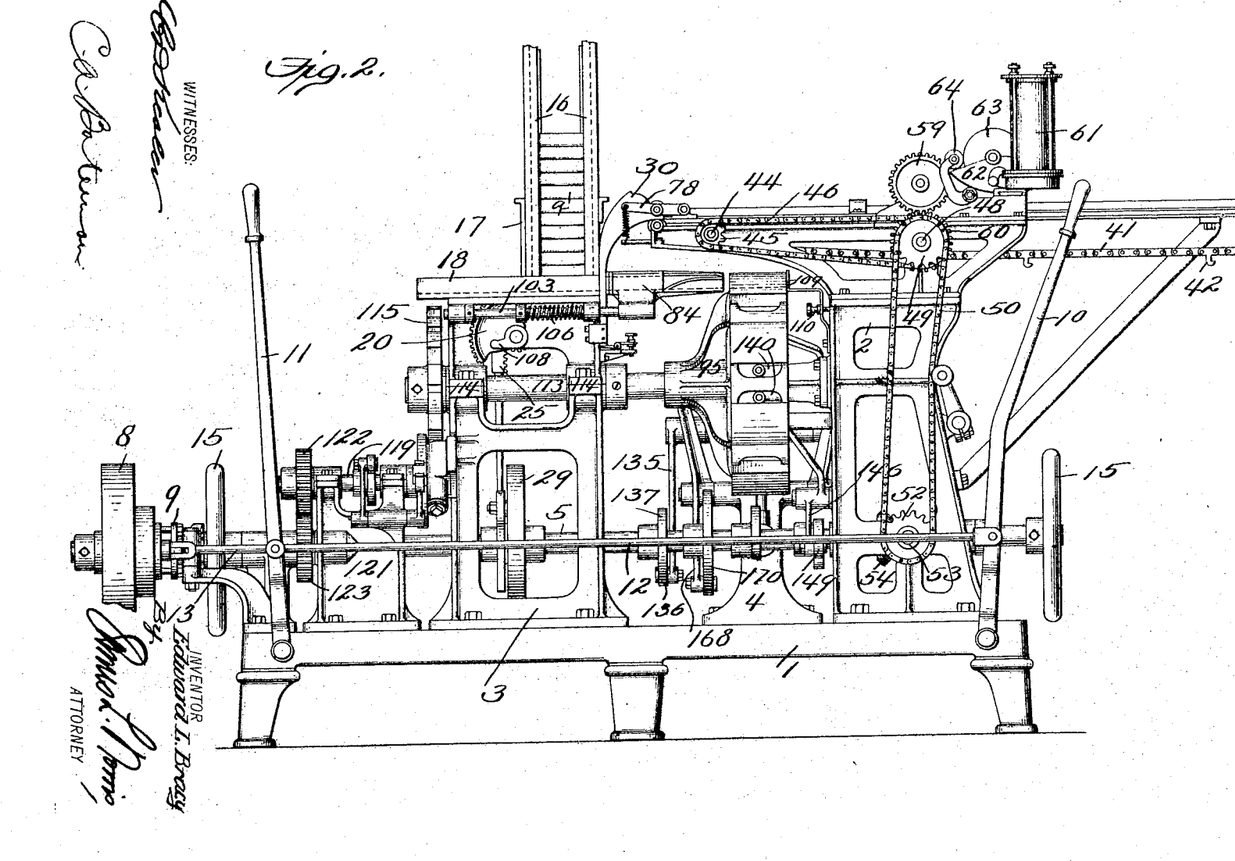
Fig. 2 is an elevation on the opposite side of the machine.
Figure 3:
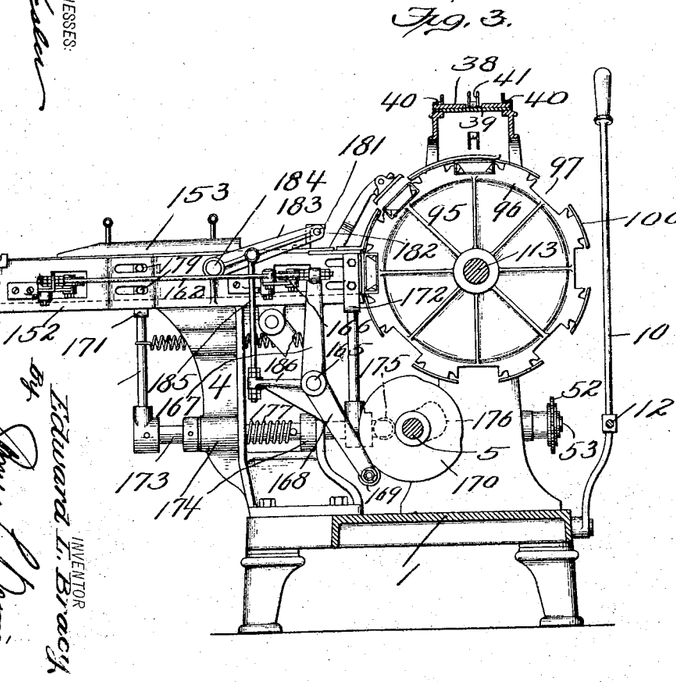
Fig. 3 represents a transverse section through the machine on the line 3—3 of Fig. 1.
Figure 4:
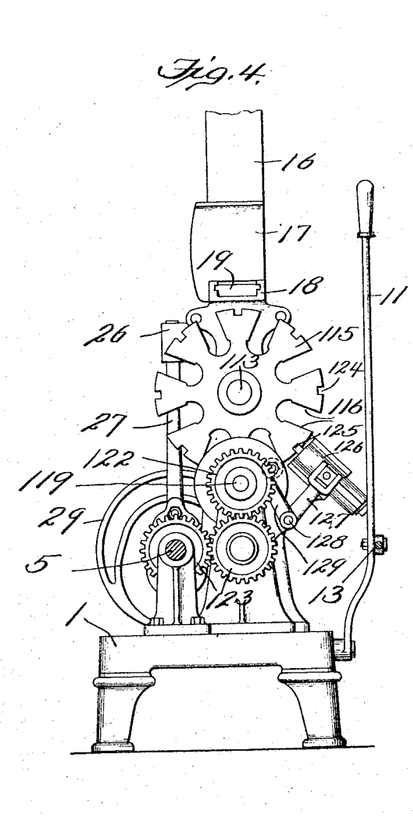
Fig. 4 represents a transverse section on the line 4—4 of Fig. 1 and looking in the direction of the arrows, certain parts of the machine being omitted.
Figure 5:
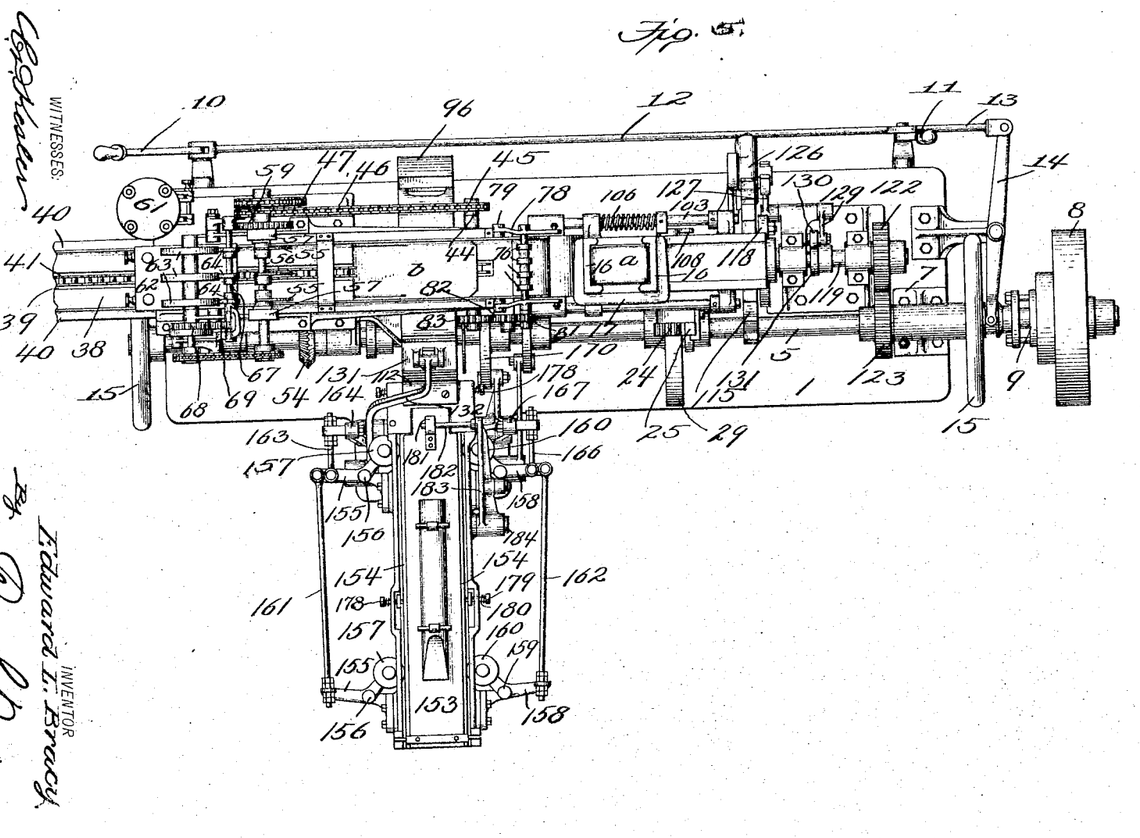
Fig. 5 is a top plan view of the machine.
Figure 6:
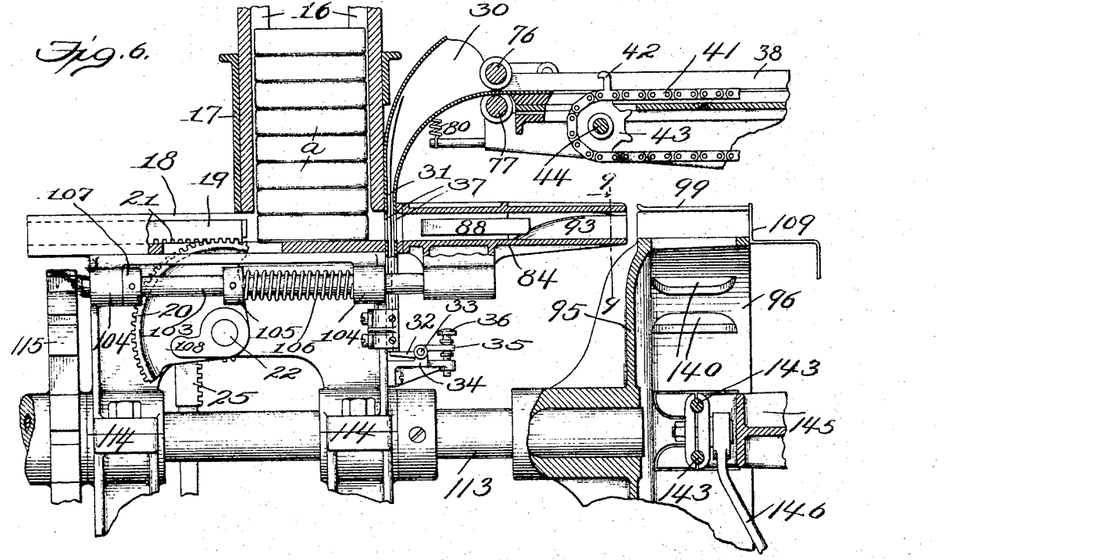
Fig. 6 is an elevation, partly in section, showing the package and label feeding devices, the mold wheel, and the shuttle and coöperative devices for folding the label around the package and transferring the label and package to the mold wheel, the parts in this figure being positioned for the commencement of a cycle of operations.
Figure 7:
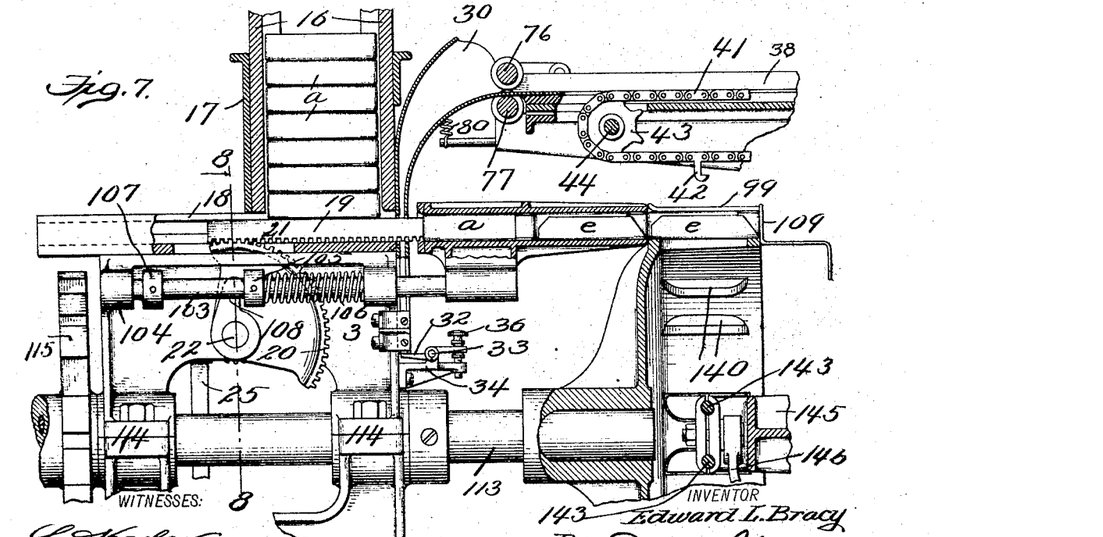
Fig. 7 is a view similar to Fig. 6 but showing the parts in the positions they occupy at the conclusion of their cycle of operations.

Different means may be employed for applying gum or adhesive to suitable parts of the label. In applying labels to packages in accordance with the method shown diagrammatically in Figs. 22–27, inclusive, two lines of gum or adhesive $c$ are applied to each label blank adjacent to the longitudinal edges of the blank and extending from points near the center of the blank to one of the ends thereof. The means for applying these lines of gum or adhesive to the label blank, according to the present embodiment of the invention, operates during the advance of the label blanks and applies the lines of gum or adhesive thereto while the label blanks are in flat form. Such means comprises a pair of gum-applying blades 55 fixed to a shaft 56, which latter is journaled in bearings 57, which bearings, as shown in Fig. 1, are adjustable vertically in a supporting bracket 58 in order that the gum-applying plates may be set at different distances from the label blanks as the latter advance along the runway. The shaft 56 is operated to rotate the gum-applying blades at proper speed and in proper relation to the advance of the label blanks along the runway by a gear 59, which gear operates with a gear 60 fixed on the shaft 48. Gum or adhesive is supplied to the blades 55 from a gum-pot 61 which supplies gum to a trough 62. A set of rotating disks 63 dip into the gum in the trough 62, thereby receiving on their peripheries gum or adhesive from the trough, and rollers 64 operate to transfer gum or adhesive from the peripheries of these disks to the peripheries of the blades 55. As shown, the disks 63 are mounted on a shaft 65 which is driven by a chain 66 from the shaft 48. The transfer rollers 64 are mounted in a frame 70 which is mounted to swing to and fro about a shaft 71, this shaft being concentric with and having thereon the gear 68. Motion is transmitted to the transfer rollers 64 by gears 68, 69, 72 and 73, the gear 73 meshing with the gear 68 and the to and fro motions are imparted to these transfer rollers by a cam 74 fixed on the shaft 65 and acting upon a roller 75 carried by an arm of swinging frame 70. In operation, the disks 63 carry on their peripheries a supply of gum or adhesive received from the trough 62, the rollers 64 are swung into engagement at intervals with the peripheries of these disks by the rocking of the frame 70, and swinging of the rollers 64 in a reverse direction carries them into engagement with the adhesive applying peripheries of the blades 55 whereby the latter are supplied with an appropriate amount of the gum or adhesive. Further rotation of the blades 55 causes them to engage the label blanks as the latter pass along the runway beneath these blades. The blades are of segmental form and of such dimensions as to apply lines of gum or adhesive $c$ to the labels, which lines are of the desired length. The peripheral speed of the blades 55 preferably equals substantially the speed of movement of the label blanks as the latter are advanced toward the chute. By using transfer rollers between the disks 63 and the adhesive applying blades 55 correct regulation of the amount of gum or adhesive applied to the label blanks is obtained. Preferably, and as shown, means is provided for transferring the label blanks from the end of the chain which advances them to the chute. As shown, a pair of ribbed rollers 76 and 77 is provided and between which the label blanks pass after leaving the chain. The ribs on these rollers are so located as to avoid the lines of gum or adhesive on the blanks. One of these rollers, the upper roller 76 in the present instance, is movable vertically relatively to the lower roller and means is provided for pressing these rollers toward one another to insure the requisite grip upon the label blank passing between them. As shown, this upper roller is journaled in a pair of arms 78 which are pivoted at 79 and springs 80 operate on these arms to draw the upper roller down toward the lower roller. One of the rollers, the lower roller 77 in the present instance, is driven at appropriate speed relatively to the speed at which the label blanks are advanced by the chain. As shown, a gear 81 is fixed to one end of the shaft carrying the lower roller. This gear meshes with an idler gear 82 and the idler gear, in turn, meshes with a gear 83, the latter being fixed on the shaft 44 which carries the chain sprocket 43.

Figures 13, 20:
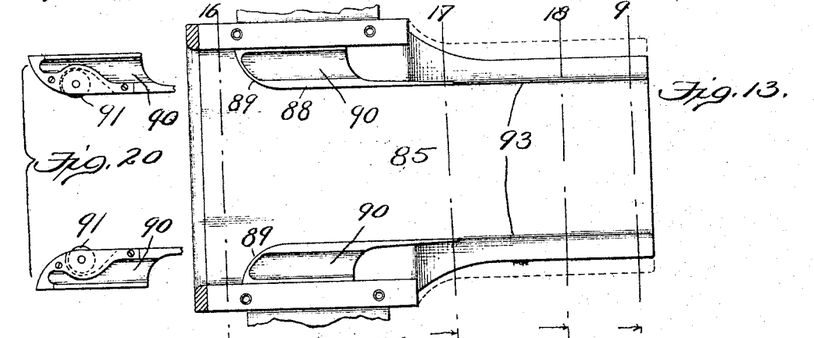
Fig. 13 is a top plan view of the shuttle, the top plate thereof being removed.
Figs. 20 and 21 show, in top plan and in elevation, respectively, a modified form of folder for the shuttle.
Figures 14, 21:
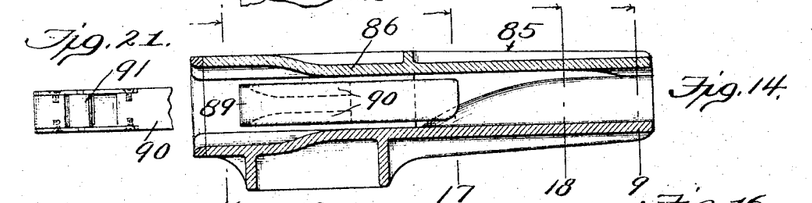
Fig. 14 represents a longitudinal section taken vertically through the shuttle.
Figure 15:
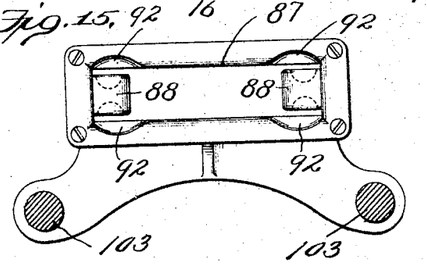
Fig. 15 shows the shuttle as viewed from its package and label receiving end.
Figure 16:
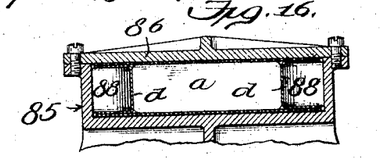
Figs. 16, 17 and 18 represent sections on the lines 16—16, 17—17 and 18—18, respectively, of Fig. 13, but illustrating diagrammatically the different forms which the label assumes at these different points in the length of the shuttle.
Figure 17:
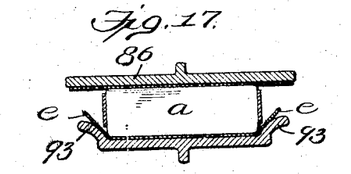
Figure 18:
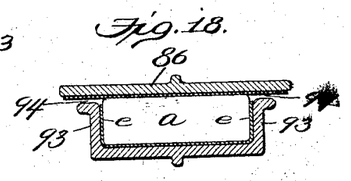
Figure 19:
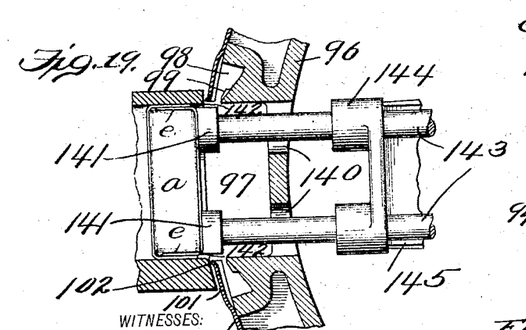
Fig. 19 is a detail view of the means for ejecting the labeled packages from the mold wheel, portions of the mold wheel and of the receiving chute being shown in section.
Figure 22:
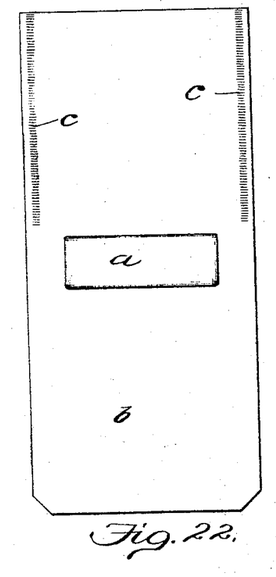
Fig. 22 is a diagrammatic view showing the mode of presenting the package to the label.
Figure 23:
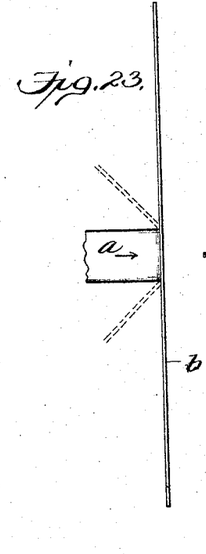
Fig. 23 is a diagrammatic view showing the mode of initially folding the label upon the package.
Figure 24:
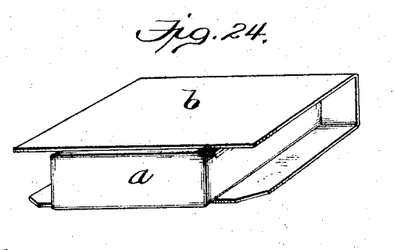
Fig. 24 is a perspective view showing the label as it is initially folded upon the package.
Figure 25:
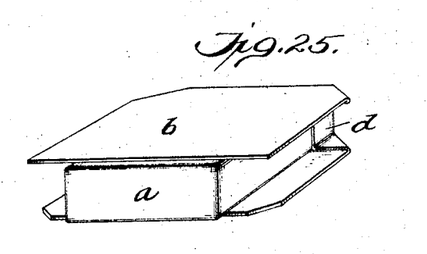
Fig. 25 is a perspective view showing the label as it is initially folded upon the package and also showing the folds at the lower corners of the package.
Figure 26:
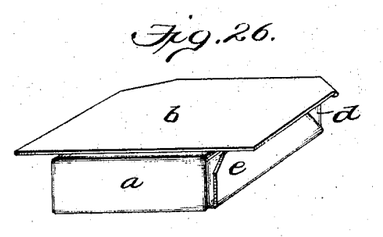
Fig. 26 is a perspective view showing the label with two of its longitudinal edges folded against the narrow sides of the package.
Figure 27:
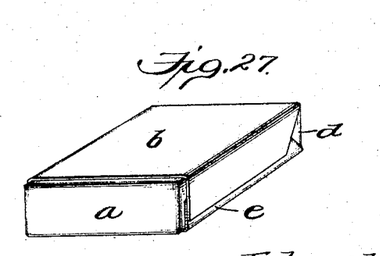
Fig. 27 is a perspective view of the package and label in completed form.

A shuttle 84 is mounted in a position to receive the packages and labels from the package magazine and the label chute, respectively, and this shuttle, according to the present invention, embodies means for producing the folds $d$, in the label at the lower corners, as shown in Fig. 25, and to produce the side folds $e$, as shown in Fig. 26. Preferably, and as shown in Figs. 13–18, inclusive, the shuttle comprises a member 85 of substantially channel form to which is applied a cover 86. The shuttle has a mouth 87 of such size and dimensions as to receive the package and the label doubled about the package, as shown in Fig. 24. The shuttle is provided near its mouth with a pair of folders 88 which project inwardly toward one another and are spaced from the upper and lower walls of the shuttle, as appears in Figs. 15 and 16. As the package with the label doubled upon its flat sides enters the shuttle, the rounded surfaces 89 at the forward ends of these folders operate upon the label to produce the folds $d$, the marginal longitudinal edges of the label passing above and below the respective folders. In order to reduce friction between the folders and the laterally projecting longitudinal margins of the label, the folders may be provided with channels or depressions 90 in their upper and lower sides. The inner sides of the folders are parallel and spaced apart a distance equal to the width of the package on its wider dimensions, the folders thus acting as guides to properly direct the package and label within the shuttle. If desired, rollers 91 may be set into the inner faces of the folders, as shown in Figs. 20 and 21, and thus reduce friction between the folders and the package as the latter advances. The mouth of the shuttle is preferably provided with clearance grooves 92 in advance of and adjacent to the folders in order to permit bending of the label to form the folds $d$ without interference. Beyond the folders, the shuttle contains shoes for bending up the lower laterally projecting longitudinal margins of the label to produce the folds $e$. As shown, these folding shoes 93 are formed by the sides of the shuttle and they operate as the package and label are advanced to fold the longitudinal margins of the label into parallelism with and against the narrow sides of the package. Spaces 94 are formed between the upper edges of the shoes and the top member 86 of the shuttle to permit the upper laterally projecting margins to extend from opposite sides of the package, as appears from Figs. 18 and 26.

Beyond the shuttle is provided a mold wheel containing pockets, the wheel being rotatable to bring the pockets successively into position to receive the packages with the labels partially folded thereon from the shuttle. This mold wheel 95 comprises, as shown, a rim 96 in which is formed a suitable number of circumferentially spaced pockets 97 which conform in shape and dimensions to those of the packages having the labels folded thereon as shown in Fig. 26. Each pocket is open at the periphery of the wheel and also at opposite sides thereof. The periphery of the wheel is provided at opposite sides of each pocket with recesses 98, the walls of the recesses adjacent to the pocket having pointed projections 99 upstanding therefrom and plates 100 are fixed to the periphery of the wheel between the pockets and the peripheral ends of these plates overlie the recesses 98. Preferably, and as shown, the edges of the adjacent plates 100 are spaced apart a distance substantially equal to the width of the package on its wider dimension, and, as shown in Fig. 11, these edges of the plates 100 are preferably offset outwardly, as at 101, and are slightly rounded as at 102. Each pocket is adapted to receive a package with the label applied thereto in the form shown in Fig. 26, the package moving endwise into the pocket of the mold wheel, the folds $d$ and $e$ in the label being retained in proper form because of the close fit of the package in the pocket and the upper laterally projecting margins of the label projecting into the recesses 98 and below the overlying edges of the plates 100 at opposite sides of the pockets. These laterally projecting margins of the label have the lines of adhesive $c$ thereon, and the pointed upstanding projections 99 in the recesses 98 serve to prevent sticking of the gummed margins of the label to the walls of the recesses or removal of the adhesive from these portions of the label by contact with the walls of the recesses. The packages with the labels thereon are introduced successively into the pockets of the mold wheel from the shuttle through the action of the plunger 19. Preferably, and as shown, the operation of the plunger in removing the lowermost package from the stack in the package magazine causes the package thus removed to fold about it the label contained in the chute 30 by forcing this label through the aperture 37 in the chute which is adjacent to the mouth of the shuttle. The advancement of this package causes the advancement of a package ahead of it in the shuttle and the advancement of this second package causes the transfer of a third package from the shuttle to the mold wheel, as shown diagrammatically in Fig. 7. In order to insure certainty and uniformity in the handling of the packages and the folding of the labels thereon, the shuttle is mounted to reciprocate in a direction toward and from the mold wheel. By reciprocating the shuttle, the end thereof adjacent to the mold wheel is brought into direct and close relation with the mold wheel at the moment a package is about to be transferred to the mold wheel, thereby preventing catching and consequent tearing or mutilation of the edges or corners of the wrappers, as would otherwise be likely to occur if a gap or crevice were left between the shuttle and mold wheel. Also, after each package has been transferred to the mold wheel, the shuttle moves out of engagement with the mold wheel, and in consequence the shuttle clears the package and its wrapper so as to avoid injury thereto, and the shuttle also clears the mold wheel, thereby avoiding injury to either the mold wheel or the shuttle. As shown, the shuttle is mounted upon a pair of slides 103 which reciprocate in guides 104 in the standard 2. One of the slides has a collar 105 fixed thereon and a compression spring 106 acts on this collar with a force tending to retract the shuttle relatively to the mold wheel. A second collar 107 serves to limit the retracting movement of the shuttle. The shaft 22 which operates the reciprocatory plunger 19 also has a finger 108 fixed thereon, and this finger, during the final portion of the rotation of the shaft 22 in a direction to advance the plunger 19, engages the stop 105 and thereby moves the shuttle so as to bring the discharge end thereof into abutting engagement with the adjacent side of the mold wheel, the mold wheel at this time being so positioned that a pocket therein will be in alinement with the shuttle and in readiness to receive a package and its label. The first part of the rotation of the shaft 22 in a direction to retract the plunger 19 will cause the finger 108 to recede, thus permitting the spring 106 to return the shuttle to its retracted position. In order to properly position the package in an endwise direction within its pocket in the mold wheel, a gage 109 may be provided as shown in Figs. 2, 6, 7 and 12. This gage is preferably non-rotatable in relation to the mold wheel, it being, in the present instance, shown positioned in alinement with the shuttle and at the remote side of the mold wheel and provided with a screw 110 whereby it may be adjusted in a direction toward and from the mold wheel or in a direction longitudinally of the pocket therein. This gage 109 serves to arrest the movement of the package as the latter reaches its proper position in the pocket. Means is also provided for preventing displacement circumferentially of the packages as they are introduced into the mold wheel and while they are being carried by the mold wheel from the receiving to the discharging position. As shown, curved plates 111 and 112 are fitted in close proximity to the periphery of the mold wheel for this purpose.

It is to be understood that the mold wheel rotates step-by-step to bring the pockets therein successively in position to receive the packages and to advance the packages to the discharging position. Different means may be provided for operating the mold wheel to effect this result. As shown, the mold wheel has its hub fixed to a supporting shaft 113, which shaft is journaled in bearings 114 in the standard 3. A Geneva movement is employed for rotating the mold wheel and the shaft 113, and means is also provided for locking or retaining the mold wheel in its successive positions. The Geneva movement shown consists, briefly, of a Geneva plate 115 fixed to the shaft 113, the notches 116 of the Geneva plate being engaged successively by the roller 117 carried by the wrist plate 118. This wrist plate is fixed to an operating shaft 119 which is journaled in bearings 120 provided on the upright 121 and the shaft 119 is driven from the shaft 5 by the gears 122 and 123. With this arrangement, it will be understood that each revolution of the shaft 119 which carries the roller 117 will cause the Geneva plate 115 to rotate one step, and by providing the Geneva plate with notches corresponding in number to the number of pockets in the mold wheel, these pockets in the mold wheel are correspondingly advanced one step before each revolution of the shaft 119. Locking means for the mold wheel is preferably provided in order to insure proper registration of the pockets in the wheel with the shuttle. As shown, the Geneva plate 115 is provided with locking recesses 124 corresponding in positions and number to the positions and number of pockets in the mold wheel relatively to the shuttle. A locking bolt 125 is mounted to reciprocate in a stationary bracket 126, this bolt being operatively connected to an arm 127, which arm is pivoted at 128 and is connected to an arm 129. The arm 129 carries a roller 130 which coöperates with a suitably shaped cam 131 fixed to the shaft 119. The cam 130 is so positioned and shaped relatively to the roller 117 that it will retract the bolt 125 preparatory to each advancement of the Geneva plate by the roller 117 and it will permit the bolt 125 to re-lock the Geneva plate upon the completion of each advancing movement of the Geneva plate.

With a view to insuring uniformity in the size of the packages, although the density of the material in the packages may vary, and furthermore, to insure a tight fitting of the label upon the package, it is preferable to provide means for compressing each package while it is contained in its pocket in the mold wheel and prior to the final folding and sealing of the label. As shown, a platen 131 is arranged to operate upon each package as the latter is brought into a position of rest, which position is intermediate the receiving and discharging positions. This platen, as shown in Figs. 1, 3, 5 and 10, is carried by an arm 132, which arm is fixed to a shaft 133 journaled in a bearing 134 provided by the standard 4, the opposite end of the shaft 133 having an arm 135 fixed thereon, and this arm carries a roller 136 which is acted on by a cam 137 on the shaft 5. Each revolution of the shaft 5 will cause the platen 131 to move to a predetermined extent toward the pocket containing the package to be compressed, the compression to which the package is subjected causing the material in the package to be densified, and as this platen has a predetermined range of movement, all the packages will be brought to a uniform size. In order to equalize the compression upon the packages, the platen is preferably pivoted to the arm 132 on the axis 138. This platen may also be utilized as a means for creasing and initially bending the gummed laterally projecting margins of the label by providing the platen with forwardly projecting lips 139.

The next step in the operation of labeling or wrapping the package is the ejecting operation which, according to the present invention, is utilized to effect the final fold of the label or wrapper. The packages are ejected from their pockets in the mold wheel by a movement radially of the mold wheel. To this end the bottom of each pocket in the mold wheel is provided with a pair of openings 140, these openings being located toward the opposite sides of the pocket. A pair of plungers 141 operate through these openings and upon the package to eject it from the pocket. By providing a pair of plungers to act upon the package at the opposite longitudinal sides thereof and providing these plungers with forwardly projecting lips 142, removal of the package may be effected with facility and without misshaping the package. The plungers may be mounted and operated in different ways. As shown, they are carried by slides 143 which operate in guides 144 formed on a stationary bracket 145, this bracket being conveniently located substantially within the mold wheel, as will appear from Figs. 6 and 7 and the plunger slides 143 are operatively connected to an actuating lever 146, the latter being pivoted on a stationary axis 147 provided with a roller 148 which coöperates with a cam 149 fixed to the shaft 5. A spring 150 operates to retract the ejector. As the package is ejected from its pocket in the mold wheel, the upper laterally projecting portion of the label which contains the lines of gum or adhesive *c* are forced between the adjacent edges of the plates 100 located at opposite sides of the pocket whereby these gummed laterally projecting portions of the label are folded inwardly and upon the folds *e* of the label to which they adhere.

Suitable means is provided for receiving the finished or the labeled packages and for insuring permanent adhesion of the folds of the labels. The receiving means shown in the present instance is generally similar to that shown in my prior patent above mentioned. Described briefly, it comprises a trough 151 which is supported on the standard 4 and extends radially relatively to the mold wheel. The labeled packages are advanced along the bottom 152 of this trough with the packages resting on one of their narrow sides, and a weight or equivalent compression device 153 bears on the upper narrow sides of the packages as the latter pass through the trough, the compression thus exerted acting to retain the gummed folds of the labels in proper position until the gum or adhesive thereon has set permanently. A pair of plates 154 are fitted within the trough, one being located at each side thereof. The packages are contained between these plates and the plates are relatively movable in a direction toward and from one another to engage the ends of the packages and to advance the packages in the trough during the ejection of another package from the mold wheel. To effect this operation, a pair of crank arms 155 is pivoted on axes 156 at one side of the trough, these crank arms carrying rollers 157 which are arranged to bear on one of the plates 154 and a similar pair of crank arms 158 is pivoted on axes 159 at the opposite side of the trough and these crank arms carry rollers 160 to operate upon the other plate 154. The crank arms 155 are connected by a link 161, the crank arms 158 are connected by a link 162, one of the crank arms 155 is connected by a link 163 to a crank 164, which latter is fixed to a shaft 165, and one of the crank arms 158 is connected by a link 166 to a crank 167, the latter also being fixed to the shaft 165. An arm 168 is fixed to the shaft 165 and carries a roller 169 which coöperates with a cam 170, the latter being fixed on the shaft 5. A pair of yokes 171 and 172 are carried by a slide 173, which latter reciprocates in guides 174 formed in the standard 4. This slide carries a roller 175 which coöperates with a cam 176, which latter is fixed to the shaft 5. A spring 177 operates upon the slide 173 to retain the roller 175 in engagement with the cam 176. The yokes 171 and 172 embrace the outer sides of the plates 154 and are connected to these plates by pins 178 and 179 whereby reciprocatory movements imparted to the yokes by the slide 173 will cause corresponding movements of the plates 154 without, however, interfering with movements of the plates 154 in a direction toward and from one another. Springs 180, however, operate to draw the plates 154 apart. In operation, the plates 154 are pressed inwardly against the ends of the packages in the trough by the action of the cam 170 which forces the rollers 157 and 160 against the outer sides of these plates. Concurrently with this action, the yokes are reciprocated by the slide 173 and the packages between the plates 154 are thereby advanced in the trough sufficiently to permit an ejected package from the mold wheel to enter the trough. This advancement of the packages in the trough takes place concurrently with the ejection of a package from the mold wheel and preferably the packages in the trough are advanced at a speed corresponding to the speed at which the package is ejected from the mold wheel. During this ejection of a package from the mold wheel and the corresponding advancement of the packages contained in the trough, it is preferable to relieve the pressure upon the gummed folds of the packages. To this end means is provided for raising the weight or pressure device 153 during the advancement of the packages. As shown, the end of the weight adjacent the mold wheel has a lug 181 thereon engaged by a rod 182 projecting laterally from a lever 183, the latter being pivoted to rock on a stationary axis 184 and connected by a link 185 to an arm 186, which latter is connected to rotate with the shaft 165. With this arrangement, the weight or pressure device 153 will be raised to relieve compression upon the gummed folds of the packages during each advancing movement of the packages, but such pressure will be restored upon completion thereof. The finished packages may be fed from the trough onto a conveyer for packing or they may be otherwise removed therefrom.

According to the present invention, the package is brought into engagement with the center of the label and is pushed together with the label through the shuttle, whereby the label is doubled upon the flat sides of the package and the folders and shoes in the shuttle make the end folds and two of the side folds formed by one side of the label. The margins of the opposite side of the label remain unfolded until the package is ejected from the mold wheel. During this period prior to the final folding of the label, the package with the label thereon is compressed to expel air, compact the material and remove the spring from the folded label and is brought to a uniform size and shape in the mold wheel.

The usual mode of effecting the final fold of the label while the package is being ejected from the mold wheel insures a close, tight fit of the label about the package, as the final folds of the label are drawn closely and tightly around the package while the package is under the compression exerted thereon by the ejectors. By providing a pair of ejectors to act on the package in rear of the corners thereof about which the final folds of the label are to be made, the package is not only retained under compression but is also maintained in proper shape, and hence enables the label to be drawn tightly around the package, and while the label is so drawn about the package, the latter is transferred to the receiving trough where the folded gummed edges of the label are held under compression for a period sufficient to insure setting or hardening of the gum and permanent adherence of the label folds. The receiving means for the labeled packages operates to advance the row of packages therein concurrently with the introduction of another package therein from the mold wheel, thus avoiding undue pressure upon each package as the same is ejected from the mold wheel.

I claim as my invention:—

1. In a labeling machine, the combination of means for doubling a label upon a package, means for folding the lower corners and one side of the label upon the package leaving one side of the label unfolded, means confining the package at those sides against which the label has been folded, means for subjecting the package to compression while so confined, and means for subsequently completing the folding of the label.

2. In a machine of the character described, the combination of folding means, means for passing a package and label through said folding means to fold the lower corners and one side of the label, leaving one side of the label unfolded, a mold to confine the package, means for compressing the package while said side of the label is unfolded and while the package is in the mold, and means for completing the folding of the label.

3. In a machine of the character described, the combination of means for doubling a label upon a package, means for folding the label upon the lower corners of the package, and for folding one side of the label upon the package, leaving the other side of the label unfolded, a mold to confine the package, means for compressing and sizing the package while the latter is in the mold, and means operative subsequently to complete the folding of the package.

4. In a machine of the character described, the combination of means for folding the bottom and one side of a label upon a package, leaving one side of the label unfolded, a mold for confining the package, means for compressing the package while the latter is confined in the mold, and means operative subsequently to draw the unfolded side of the label tightly about the package.

5. In a machine of the character described, the combination of package feeding means, label feeding means, means for folding one side and the lower corners of a label upon a package, and having portions to accommodate the other unfolded side of the label, and a mold wheel having a pocket to receive the package and label and having portions to accommodate the unfolded side of the label.

6. In a machine of the character described, the combination of means for positioning a label, means for presenting a package endwise to the center of the label and for advancing the package while in such engagement with the label, means for folding the lower corners of the label against the corresponding corners of the package during the advancement thereof, means for folding the margins of one side of the label against the package during such advancement, leaving the margins of the other side of the label unfolded, means for compressing the package while in such condition, and means for subsequently folding said unfolded margins of the label.

7. In a machine of the character described, the combination of a member having corner and side folders therein, means for pushing a packing having a label thereon relatively to said member to effect folding of the corners and the margins of one side of the label against the package, leaving the margins of one side of the label unfolded, said member having means to accommodate the unfolded margins of the label, and means for compressing the package while said margins of the label are unfolded.

8. In a machine of the character described, the combination of means for advancing a package endwise thereof, means for presenting a label transversely in the path of advancement of the package to effect doubling of the label on the package, means for folding the label against the forward corners of the package, means for subsequently folding the margins of one side of the label against the package, means for holding the margins of the other side of the label in substantially flat unfolded form, and means for compressing the package while said latter margins are unfolded.

9. In a machine of the character described, the combination of a movable mold member, a shuttle movable toward and from the mold member and embodying means for folding the corners and the margins of the side of the label against a package and for holding the margins of the other side of the label in substantially flat unfolded form, and means for advancing a package and label through said shuttle and into the mold member.

10. In a machine of the character described, the combination of a movable mold member, means including a shuttle for folding the corners and the margins of one side of a label against a package, means for advancing the package and label through the shuttle and into the mold member, and means for moving the shuttle toward the mold member during the transfer of a package and label thereto from the shuttle and for causing retraction of the shuttle preparatory to movement of the mold member.

11. In a machine of the character described, the combination of a label chute, a mold member, a shuttle reciprocable between said chute and member and embodying means for folding the corners and the margins of one side of a label against a package, and means for advancing a package endwise against the center of a label in said chute and through the shuttle into the mold member.

12. In a machine of the character described, the combination of means for applying a label to a package and for folding an end and one side of the label thereon, and a mold adapted to receive the package with the label thus folded, the mold having portions to accommodate the unfolded side of the label and also having devices to fold said latter mentioned side of the label.

13. In a machine of the character described, the combination of means for applying a label to a package and folding an end and one side of the label thereon, leaving one side of the label unfolded, and a mold adapted to receive the package with the label thus folded and having means for folding the unfolded side of the label during discharging movement of the package relatively to the mold.

14. In a machine of the character described, the combination of means for applying a label to a package and for folding an end and one side of the label thereon, and a mold adapted to receive the package with the label thus folded thereon, the mold having recesses at opposite sides thereof to accommodate the margins of the unfolded side of the label.

15. In a machine of the character described, the combination of means for applying a label to a package and for folding an end and one side of the label thereon, leaving one side of the label unfolded, and a mold adapted to receive the package with the label thus folded and to accommodate the unfolded side and having means for folding the latter mentioned side of the label by a discharging movement of the package relatively to the mold.

16. In a machine of the character described, a mold adapted to receive a package with a label folded at one end and one side against the package, another side of the label being unfolded, and folders arranged to overlie the unfolded side of the label while the package is contained in the mold and operative to fold said side of the label during discharging movement of the package relatively to the mold.

17. In a machine of the character described, a mold adapted to receive a package with a label folded at one side and unfolded at its opposite side, means for subjecting the package and label to compression while the side thereof is unfolded, and means for folding the unfolded side of the label during ejection of the package from the mold.

18. In a machine of the character described, a mold adapted to receive a package with a label folded at one side and unfolded at its opposite side, the mold having opposed walls to confine opposite edges of the package, margins of the unfolded side of the label projecting from opposite edges of the package and beyond said opposed walls of the mold, means for ejecting the package and label from the mold, and means overlying the projecting margins of the unfolded side of the label and operative by the ejecting movement of the package for folding said margins of the label toward the adjacent edges of the package.

19. In a machine of the character described, a mold adapted to receive a package and label with one side of the label folded thereon and the opposite side of the label unfolded, the mold having opposed walls to confine opposite edges of the package and margins of the unfolded side of the label projecting beyond said opposed walls of the mold, folding plates projecting toward said opposed walls of the mold from opposite sides thereof and overlying the projecting margins of the label, and means for ejecting the package and label from the mold in a direction between said plates to effect folding of said projecting margins of the unfolded side of the label.

20. In a machine of the character described, a mold adapted to receive a package and label with one side of the label folded thereon and the opposite side of the label unfolded, the mold having recesses at opposite sides thereof to accommodate the margins of the unfolded side of the label, folding members underlying said recesses and the margins of the unfolded side of the label, and means for pushing the package and label from the mold and between the adjacent edges of said plates to effect folding of the said unfolded side of the label.

21. In a machine of the character described, a mold adapted to receive a package and label with one side of the label folded thereon and the opposite side of the label unfolded, the mold having opposed walls to confine opposite edges of the package and margins of the unfolded side of the label projecting beyond said walls, folding plates between which the package and label are movable to effect folding of the projecting margins of the label, said plates overlying the projecting margins of the label and having their operative edges in approximate alinement with the opposed walls of the mold, and an ejector comprising a pair of platens operative upon the package in approximate alinement with the opposed walls of the mold and the operative edges of said folding plates.

22. In a machine of the character described, a mold adapted to receive a package and label with one side of the latter folded on the package and the opposite side of the label unfolded, folding plates having their operative edges arranged at opposite sides of the mold, a compression platen operative between said edges of the folding plates and upon the package and label in the mold, and an ejector operative to remove the package and label from the mold and to move the package and label between said edges of the folding plates to fold the unfolded side of the label.

23. In a machine of the character described, the combination of means for positioning a label, means for folding corners of the label, means for folding one side of the label, a side of the label being left unfolded, a mold, package feeding means, means operative to receive a package from the feeding means and to push it against the label to double the latter about the package and to advance the package with the label doubled thereon to the corner folding means, the package so advanced acting to advance a package and label ahead of it from the corner folding means to the side folding means, and the advance of the second mentioned package acting to advance a package from the side folding means to the mold, means for compressing each package in the mold, and means for subsequently folding the remaining side of the label.

24. In a machine of the character described, the combination of means for folding the corners and one side of a label against a package, leaving another side of the label unfolded, a mold to receive the package with the label so folded thereon, means for subjecting the package and partially folded label to compression, means for ejecting the package and label from the mold, means operative during ejection of the package and label to effect folding of said unfolded side of the label, and means for receiving the package and label after such ejection and operative to maintain compression upon the last-made folds of the label.

25. In a machine of the character described, the combination of means for intermittently advancing a row of packages having labels folded thereon, and means for subjecting the last-made folds of the row of packages to compression during the periods between the advancing movements of such packages and for relieving such compression during the advancing movements of the packages.

In testimony whereof I have hereunto set my hand in presence of two subscribing witnesses.

EDWARD L. BRACY.

Witnesses:
  LOUIS FISCHER,
  WM. D. GOULD.